US012262386B2

(12) United States Patent
Li et al.

(10) Patent No.: US 12,262,386 B2
(45) Date of Patent: Mar. 25, 2025

(54) METHOD FOR HARQ-ACK FEEDBACK FOR PDCCH AND DEVICE

(71) Applicant: VIVO MOBILE COMMUNICATION CO., LTD., Guangdong (CN)

(72) Inventors: Dongru Li, Guangdong (CN); Kai Wu, Guangdong (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 263 days.

(21) Appl. No.: 17/836,924

(22) Filed: Jun. 9, 2022

(65) Prior Publication Data
US 2022/0303979 A1    Sep. 22, 2022

Related U.S. Application Data
(63) Continuation of application No. PCT/CN2020/134194, filed on Dec. 7, 2020.

(30) Foreign Application Priority Data
Dec. 13, 2019  (CN) .......................... 201911286301.4

(51) Int. Cl.
| H04W 72/21 | (2023.01) |
| H04L 1/1812 | (2023.01) |
| H04L 5/00 | (2006.01) |
| H04W 72/0446 | (2023.01) |
| H04W 72/23 | (2023.01) |

(52) U.S. Cl.
CPC ........... *H04W 72/21* (2023.01); *H04L 1/1812* (2013.01); *H04L 5/0053* (2013.01); *H04W 72/0446* (2013.01); *H04W 72/23* (2023.01)

(58) Field of Classification Search
CPC ..... H04L 1/0003; H04L 1/165; H04L 1/1812; H04L 1/1822; H04L 1/1858; H04L 1/1861; H04L 1/1864; H04L 5/0007; H04L 5/0053; H04L 5/0055; H04L 5/0098;
(Continued)

(56) References Cited

U.S. PATENT DOCUMENTS 10,750,488 B2 *  8/2020  He ......................... H04W 72/23
12,028,293 B2 *  7/2024  Xu ........................ H04L 5/0098
(Continued)

FOREIGN PATENT DOCUMENTS

CN    109586856 A    4/2019
CN    109639398 A    4/2019
(Continued)

OTHER PUBLICATIONS

First Office Action for Chinese Application No. 201911286301.4, dated Nov. 2, 2021, 11 Pages.
(Continued)

*Primary Examiner* — Eric Nowlin
(74) *Attorney, Agent, or Firm* — BROOKS KUSHMAN P.C.

(57) ABSTRACT

A method for HARQ-ACK feedback for a PDCCH without scheduling data, and a device are provided. The method includes: receiving configuration information of higher layer
(Continued)

signaling, where the configuration information is used for determining a format of HARQ-ACK feedback information in a dynamic HARQ-ACK codebook for the PDCCH without scheduling data.

20 Claims, 5 Drawing Sheets

(58) Field of Classification Search
CPC . H04W 24/10; H04W 72/0446; H04W 72/21; H04W 72/23; Y02D 30/70
See application file for complete search history.

(56) References Cited

U.S. PATENT DOCUMENTS

| | | | | |
|---|---|---|---|---|
| 2016/0381674 | A1* | 12/2016 | Kim | H04L 1/1819 370/329 |
| 2018/0167173 | A1 | 6/2018 | Guan et al. | |
| 2019/0045489 | A1* | 2/2019 | He | H04W 72/12 |
| 2019/0132092 | A1 | 5/2019 | Chen et al. | |
| 2019/0159251 | A1 | 5/2019 | Li et al. | |
| 2019/0166610 | A1* | 5/2019 | Lee | H04W 52/42 |
| 2019/0335435 | A1 | 10/2019 | Gou et al. | |
| 2020/0213044 | A1 | 7/2020 | Peng et al. | |
| 2020/0343954 | A1* | 10/2020 | Takeda | H04W 72/21 |
| 2021/0036835 | A1* | 2/2021 | Yoshioka | H04L 5/0098 |
| 2021/0058196 | A1 | 2/2021 | Chen et al. | |
| 2021/0143970 | A1* | 5/2021 | Xu | H04L 5/001 |
| 2024/0089977 | A1* | 3/2024 | Bai | H04B 7/0695 |

FOREIGN PATENT DOCUMENTS

| | | | | |
|---|---|---|---|---|
| CN | 110034892 | A | 7/2019 | |
| CN | 110035550 | A | 7/2019 | |
| CN | 110149172 | A | 8/2019 | |
| CN | 110351018 | A | 10/2019 | |
| EP | 3429109 | A1 * | 1/2019 | H04L 1/16 |
| EP | 3429109 | B1 * | 12/2020 | H04L 1/16 |
| EP | 3840265 | A1 * | 6/2021 | H04L 1/16 |
| JP | 2023500454 | A | 1/2023 | |
| WO | WO-2017161541 | A1 * | 9/2017 | H04L 1/16 |
| WO | WO-2017162205 | A1 * | 9/2017 | H04L 1/16 |
| WO | 2019072074 | A1 | 4/2019 | |
| WO | 2019084449 | A1 | 5/2019 | |
| WO | WO-2020096438 | A1 * | 5/2020 | H04L 1/1614 |
| WO | WO-2021092273 | A1 * | 5/2021 | H04L 1/1607 |

OTHER PUBLICATIONS

International Search Report and Written Opinion for Application No. PCT/CN2020/134194, dated Mar. 8, 2021, 8 Pages.
3GPP, "3rd Generation Partnership Project; Technical Specification Group Radio Access Network; NR; Physical Layer Procedures for Control," 3GPP TS 38.213, Sep. 2019, V.15.7.0, Release 15, 27 Pages (5 parts).
Qualcomm Incorporated, "SCell Dormancy and Fast SCell Activation," 3GPP TSG-RAN WG1 #99, Agenda item 7.2.13.3, Nov. 18-22, 2019, R1-1912980, Reno, NV, USA, 13 Pages.
First Office Action for Japanese Application No. 2022-526804, dated May 26, 2023, 3 Pages.
Samsung "Text Proposal to 38.213 on Semi-static HARQ-ACK Codebook" 3GPP TSG-RAN WG1 Meeting AH 1801, Vancouver, Canada, Jan. 2018, R1-1801268, 9 Pages.
Second Office Action for Japanese Application No. 2022-526804, dated Oct. 26, 2023, 2 Pages.
Samsung "Introduction of Industrial IoT" 3GPP TSG-RAN WG1 Meeting #99, Reno, USA, Nov. 2019, R1-1913645, 20 Pages.
Extended European Search Report for Application No. 241777943.8 dated Jun. 26, 2024, 14 Pages.
Huawei, HiSilicon "HARQ enhancements in NR unlicensed" 3GPP TSG RAN WG1 Meeting #98bis, Chongqing, China, Oct. 2019, RI-1910047, 12 Pages.
Ericsson "Summary#4 of efficient and low latency serving cell configuration/activation/setup" Reno, USA, Nov. 2019, R1-1913549, 25 Pages.
First Office Action for Japanese Application No. 2024-051490, dated Dec. 20, 2024, 8 Pages.
First Office Action for Korean Application No. 10-2022-7022974, dated Nov. 8, 2024, 17 Pages.
MCC Support "Final Report of 3GPP Tsg Ran WG1 #98 v2.0.0, (Prague, Czech Rep, Aug. 26-30, 2019)" 3GPP TSG RAN WG1 Meeting #98bis, Chongqing, China, Oct. 2019, R1-1911429, 180 Pages.
3GPP "3rd Generation Partnership Project; Technical Specification Group Radio Access Network; NR; Physical layer procedures for control—(Release 15)" 3GPP TS 38.213 V15.4.0 (Dec. 2018), 2018, 104 Pages.

* cited by examiner

METHOD FOR HARQ-ACK FEEDBACK FOR PDCCH AND DEVICE

CROSS-REFERENCE TO RELATED APPLICATIONS

This application is a continuation of PCT International Application No. PCT/CN2020/134194 filed on Dec. 7, 2020, which claims priority to Chinese Patent Application No. 201911286301.4, filed on Dec. 13, 2019, which are incorporated herein by reference in their entireties.

TECHNICAL FIELD

Embodiments of the present invention relate to the field of communications technologies, and specifically, to a method for hybrid automatic repeat request acknowledgement (HARQ-ACK) feedback for a physical downlink control channel (PDCCH) without scheduling data, and a device.

BACKGROUND

In related technologies, it is determined that in an active time, secondary cell (SCell) dormancy indication (Scell dormancy indication) can be performed using a physical downlink control channel (PDCCH) without scheduling data, and that a terminal feeds back correct reception of the PDCCH by sending a dynamic codebook type—based acknowledgement (ACK).

However, currently, a format of HARQ-ACK feedback information for a PDCCH that indicates SCell dormancy without scheduling data, and a timeline carrying uplink control information (UCI) of the HARQ-ACK have not been determined. This leads to inconsistent understanding of a HARQ-ACK feedback for the PDCCH between the terminal and a base station, such that the base station cannot correctly receive the HARQ-ACK feedback corresponding to the PDCCH.

SUMMARY

An objective of embodiments of the present invention is to provide a method for HARQ-ACK feedback for a PDCCH without scheduling data, and a device.

According to a first aspect, an embodiment of the present invention provides a method for HARQ-ACK feedback for a PDCCH without scheduling data, including:
receiving configuration information of higher layer signaling, where the configuration information is used for determining a format of HARQ-ACK feedback information in a dynamic HARQ-ACK codebook for the PDCCH without scheduling data.

According to a second aspect, an embodiment of the present invention provides a method for HARQ-ACK feedback for a PDCCH without scheduling data, including:
determining, based on a reception time of a PDCCH that indicates secondary cell dormancy without scheduling data, a timeline of uplink control information UCI which contains HARQ-ACK feedback information of the PDCCH, or a timeline of UCI multiplexing HARQ-ACK feedback information of the PDCCH and other information.

According to a third aspect, an embodiment of the present invention provides a method for indicating a HARQ-ACK feedback for a PDCCH without scheduling data, including:
sending configuration information of higher layer signaling, where the configuration information is used for determining a format of HARQ-ACK feedback information in a dynamic HARQ-ACK codebook for the PDCCH without scheduling data.

According to a fourth aspect, an embodiment of the present invention provides a terminal, including:
a first receiving module, configured to receive configuration information of higher layer signaling, where the configuration information is used for determining a format of HARQ-ACK feedback information in a dynamic HARQ-ACK codebook for a PDCCH without scheduling data.

According to a fifth aspect, an embodiment of the present invention provides a terminal, including:
a determining module, configured to determine, based on a reception time of a PDCCH that indicates secondary cell dormancy without scheduling data, a timeline of uplink control information UCI which contains HARQ-ACK feedback information of the PDCCH, or a timeline of UCI multiplexing HARQ-ACK feedback information of the PDCCH and other information.

According to a sixth aspect, an embodiment of the present invention provides a network device, including:
a first sending module, configured to send configuration information of higher layer signaling, where the configuration information is used for determining a format of HARQ-ACK feedback information in a dynamic HARQ-ACK codebook for a PDCCH without scheduling data.

According to a seventh aspect, an embodiment of the present invention provides a communications device, including a processor, a memory, and a program stored in the memory and capable of running on the processor, where when the program is executed by the processor, the steps of the method for HARQ-ACK feedback for a PDCCH without scheduling data according to the first aspect or the second aspect are implemented; or the steps of the method for indicating a HARQ-ACK feedback for a PDCCH without scheduling data according to the third aspect are implemented.

According to an eighth aspect, an embodiment of the present invention provides a computer-readable storage medium, where the computer-readable storage medium stores a computer program, and when the computer program is executed by a processor, the steps of the method for HARQ-ACK feedback for a PDCCH without scheduling data according to the first aspect or the second aspect are implemented; or the steps of the method for indicating a HARQ-ACK feedback for a PDCCH without scheduling data according to the third aspect are implemented.

BRIEF DESCRIPTION OF DRAWINGS

Other advantages and benefits will become apparent to those of ordinary skill in the art by reading the following detailed descriptions of implementations. The accompanying drawings are merely intended to illustrate the objectives of the preferred embodiments and are not intended to limit the present invention. Throughout the accompanying drawings, the same reference numerals represent the same components. In the accompanying drawings.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates the following three cases: only A, only B, or both A and B.

In the embodiments of the present invention, the word such as "an example" or "for example" is used to represent giving an example, an instance, or an illustration. Any embodiment or design solution described as "an example" or "for example" in the embodiments of the present invention shall not be interpreted to be more preferential or advantageous than other embodiments or design solutions. To be precise, the terms such as "an example" or "for example" are intended to present a related concept in a specific manner.

In this specification, a PDCCH without scheduling data (or referred to as a PDCCH without scheduling data) may include one or more of the following:
 (1) a PDCCH indicating SCell dormancy without scheduling data (SCell dormancy indication and without scheduling PDSCH reception);
 (2) a PDCCH indicating semi-persistent scheduling (SPS) PDSCH release; and
 (3) a PDCCH used for other functions without scheduling data.

In this specification, a DCI format of a PDCCH without scheduling data includes: DCI format 1-1 and/or DCI format 1-2.

In this specification, the PDCCH indicating SCell dormancy without scheduling data may be a PDCCH which is used for indicating that, in a case that a resource allocation (RA) type is 0 or 1, bits in a frequency domain resource assignment (FDRA) field are all 0s or 1s, a codebook type of a HARQ-ACK feedback is type 2 (type-2), and an active downlink bandwidth part (DL BWP) of one active SCell is a dormant bandwidth part (dormant-BWP) or a first non-dormant BWP inside an active time (first-non-dormant-BWP-ID-for-DCI-inside-active-time).

In this specification, the HARQ-ACK feedback for the PDCCH indicating SCell dormancy without scheduling data uses a codebook of type 2 (type-2) (that is, pdsch-HARQ-ACK-Codebook=dynamic) and is a HARQ-ACK feedback of a dynamic codebook, and other PDCCHs that do not schedule data may use a codebook of type 1 (type1) (that is, pdsch-HARQ-ACK-Codebook=semi-static) or type 2.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. The CDMA system can implement radio technologies such as CDMA2000 and universal terrestrial radio access (UTRA). UTRA includes wideband CDMA (Wideband Code Division Multiple Access, WCDMA) and other CDMA variants. The TDMA system can implement radio technologies such as global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

Figure 1:
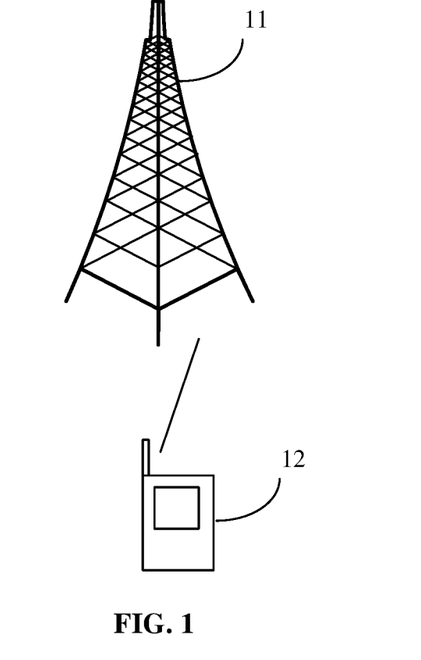
FIG. 1 is a schematic architectural diagram of a wireless communications system according to an embodiment of the present invention.

The following describes the embodiments of the present invention with reference to the accompanying drawings. A method for HARQ-ACK feedback for a PDCCH without scheduling data, and a device provided in the embodiments of the present invention can be applied to wireless communications systems. FIG. 1 is a schematic architectural diagram of a wireless communications system according to an embodiment of the present invention. As shown in FIG. 1, the wireless communications system may include a network device 11 and a terminal 12. The terminal 12 may be denoted as UE12, and the terminal 12 may perform communication (signaling transmission or data transmission) with the network device 11. In practical applications, connection between the above devices may be a wireless connection. For ease of visually representing the connection relationship between the devices, a solid line is used to indicate that in FIG. 1.

The network device 11 provided in this embodiment of the present invention may be a base station. The base station may be a commonly used base station or an evolved node base station (eNB), or may be a network device in a 5G system (for example, a next generation node base station (gNB) or a transmission and reception point (TRP), or the like.

The terminal 12 provided in this embodiment of the present invention may be a mobile phone, a tablet computer, a notebook computer, an ultra-mobile personal computer (UMPC), a netbook, a personal digital assistant (PDA), a mobile internet device (MID), a wearable device, a vehicle-mounted device, or the like.

Figure 2:
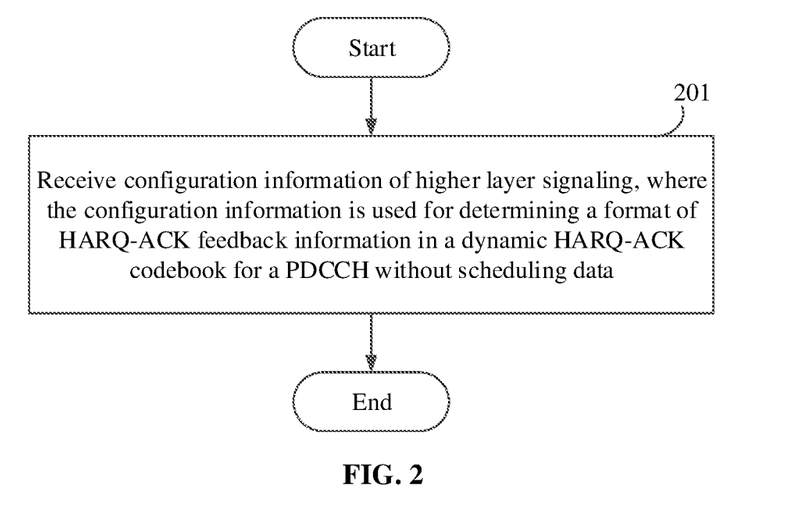
FIG. 2 is a first flowchart of a method for HARQ-ACK feedback for a PDCCH without scheduling data according to an embodiment of the present invention.

Referring to FIG. 2, an embodiment of the present invention provides a method for determining a HARQ-ACK feedback for a PDCCH without scheduling data. The method may be executed by a terminal, and includes step 201.

Step 201: Receive configuration information of higher layer signaling, where the configuration information is used for determining a format of HARQ-ACK feedback information in a dynamic HARQ-ACK codebook for a PDCCH without scheduling data.

In the embodiments of the present invention, the PDCCH without scheduling data may be a PDCCH with a resource allocation (RA) field being all 0s or 1s. For example, in a case that the resource allocation is resource allocation type 0 (resourceAllocation=resourceAllocationType0), bits in a frequency domain resource assignment (FDRA) field in DCI format 1_1 or DCI format1_2 are all 0s; or in a case that the resource allocation is resource allocation type 1 (resourceAllocation=resourceAllocationType1), bits in an FDRA field in DCI format 1_1 or DCI format1_2 are all 1s. The dynamic HARQ-ACK codebook may also be referred to as a Type2 HARQ-ACK codebook.

In the embodiments of the present invention, the dynamic HARQ-ACK codebook may also be referred to as a Type2 HARQ-ACK codebook.

In the embodiments of the present invention, the format of the HARQ-ACK feedback information may be a quantity of bits of a HARQ-ACK.

In the embodiments of the present invention, the higher layer signaling may be radio resource control (RRC) signaling, and certainly, is not limited thereto.

In the embodiments of the present invention, after the format of the HARQ-ACK feedback information in the dynamic HARQ-ACK codebook for the PDCCH without scheduling data is determined, the HARQ-ACK feedback information of the PDCCH without scheduling data may be further fed back based on the format of the HARQ-ACK feedback information. Optionally, the terminal in the embodiments of the present invention may feed back the HARQ-ACK feedback information for the PDCCH without scheduling data in any one of the following manners:

manner 1: feeding back, based on the format of the HARQ-ACK feedback information, the HARQ-ACK feedback information for the PDCCH without scheduling data in a first sub-codebook, where the first sub-codebook is used for a transport block TB-based HARQ-ACK feedback; or manner 2: feeding back, based on the format of the HARQ-ACK feedback information, the HARQ-ACK feedback information for the PDCCH without scheduling data in a second sub-codebook, where the second sub-codebook is used for a code block group (CBG)-based HARQ-ACK feedback.

The first sub-codebook transmits the HARQ-ACK feedback for the following information:
(1) in a serving cell configured with PDSCH-code block group transmission (CodeBlockGroupTransmission), transmitting SPS PDSCH release, SPS PDSCH reception, and transport block (TB)-based PDSCH receptions (TB-based PDSCH receptions) scheduled by DCI format1-0; and
(2) in a cell configured with no PDSCH-CodeBlock-GroupTransmission, transmitting PDSCH data receptions scheduled by DCI format1-1 and DCI format1-0.

The second sub-codebook transmits the HARQ-ACK feedback for the following information:
(1) in a serving cell configured with PDSCH-CodeBlock-GroupTransmission, transmitting CBG-based PDSCH receptions scheduled by DCI format1-1.

In addition, a value of counter downlink assignment index (counter DAL C-DAI) and a value of total DAI (T-DAI) are applicable to each HARQ-ACK sub-codebook. The UE generates the dynamic HARQ-ACK codebook by adding the second HARQ-ACK sub-codebook to the first HARQ-ACK sub-codebook.

In the embodiments of the present invention, the terminal may ignore a T-DAI indication in DCI format1-1 or DCI format1-2. A feedback for DCI format1-0 is a feedback based on transport blocks (TB), with only C-DAI instead of T-DAI. Feedbacks for DCI format1-1 and DCI format1-2 include both C-DAI and T-DAI.

In some implementations, before feeding back the HARQ-ACK feedback information for the PDCCH without scheduling data, the method may further include:

receiving the higher layer signaling or DCI, where the higher layer signaling or the DCI indicates the terminal to feed back the HARQ-ACK feedback information for the PDCCH without scheduling data in the first sub-codebook or the second sub-codebook. In other words, through a network, the UE is indicated, by using the higher layer signaling or the DCI, to feed back the HARQ-ACK feedback information for the PDCCH without scheduling data in the first sub-codebook or the second sub-codebook.

It can be understood that the higher layer signaling may be RRC signaling, and certainly, is not limited thereto.

In some implementations, the DCI includes a first field, where a bit in the first field indicates the terminal to feed back the HARQ-ACK feedback information for the PDCCH without scheduling data in the first sub-codebook or the second sub-codebook; where the first field includes one or more of the following:
(1) modulation and coding scheme (MCS);
(2) redundancy version (RV);
(3) HARQ process number (HARQ process number);
(4) new data indication (NDI); and
(5) total downlink assignment index (total DAI, t-DAI).

For example, a bit in the MCS field, RV field, HARQ process number field, NDI field, and/or T-DAI field in the DCI may be used to indicate to use the first sub-codebook or the second sub-codebook. For example, "1" is used to indicate to use the first sub-codebook, and "0" is used to indicate to use the second sub-codebook. Certainly, this is not limited thereto.

In some implementations, the configuration information in the step 201 may indicate at least one of the following:
(1) a quantity of TBs of a physical downlink shared channel (PDSCH), such as a maximum quantity of TBs of the PDSCH;
(2) a quantity of CBGs of each TB of the PDSCH, such as a maximum quantity of CBGs of each TB of the PDSCH;
(3) a quantity of transmission and reception points (TRP) for transmitting the PDSCH, such as a maximum quantity of TRPs for transmitting the PDSCH;
(4) a dynamic sub-codebook corresponding to the HARQ-ACK feedback information for the PDCCH without scheduling data; and
(5) whether HARQ-ACK spatial bundling (spatial bundle) indication is enabled.

In some implementations, the format of the HARQ-ACK feedback information may include a quantity of bits of the HARQ-ACK feedback information, where the quantity of bits of the HARQ-ACK feedback information is determined based on the following:
  the maximum quantity of CBGs of a TB of the PDSCH and the maximum quantity of TBs transmitted by the PDSCH that are indicated by the configuration information;
  or
  the maximum quantity of TRPs for transmitting the PDSCH and the maximum quantity of TBs transmitted by the PDSCH that are indicated by the configuration information;
  or
  a maximum quantity of CBGs of a TB of the PDSCH, the maximum quantity of TBs transmitted by the PDSCH, and the maximum quantity of TRPs for transmitting the PDSCH that are indicated by the configuration information.

In some implementations, the quantity of bits of the HARQ-ACK feedback information in the dynamic HARQ-ACK codebook for the PDCCH without scheduling data is equal to:
  a product of the maximum quantity of CBGs of a TB of the PDSCH and the maximum quantity of TBs transmitted by the PDSCH;
  or
  a product of the maximum quantity of TRPs for transmitting the PDSCH and the maximum quantity of TBs transmitted by the PDSCH;
  or
  a product of the maximum quantity of CBGs of a TB of the PDSCH, the maximum quantity of TBs transmitted by the PDSCH, and the maximum quantity of TRPs for transmitting the PDSCH.

The following example 1 to example 5 describes how to determine the format of the HARQ-ACK feedback information for the PDCCH without scheduling data based on the configuration information of the higher layer signaling.

Example 1 and example 2 describe feeding back, based on the first sub-codebook, the HARQ-ACK feedback information for the PDCCH without scheduling data, and example 3, example 4, and example 5 describe feeding back, based on the second sub-codebook, the HARQ-ACK feedback information for the PDCCH without scheduling data.

Example 1: The configuration information indicates that a maximum quantity of downlink TBs of a PDSCH is 2, and the format of the HARQ-ACK feedback information for the PDCCH without scheduling data includes 2 HARQ-ACK bits; and Example 2: The configuration information indicates that a maximum quantity of downlink TBs of a PDSCH is 2 and that the HARQ-ACK spatial bundling indication is enabled, and the format of the HARQ-ACK feedback information for the PDCCH without scheduling data includes 1 HARQ-ACK bit.

Optionally, a process for generating the 1 HARQ-ACK bit may be: obtaining the 1 HARQ-ACK bit through an AND operation between two bits corresponding to two TBs. It can be understood that if there is only one TB transmission currently, a feedback bit corresponding to the other TB is set to an ACK by default.

Example 3: The quantity of bits of the HARQ-ACK feedback information in the dynamic HARQ-ACK codebook for the PDCCH without scheduling data is determined based on the maximum quantity of CBGs of a TB of the PDSCH and the maximum quantity of TBs transmitted by the PDSCH that are indicated by the configuration information.

For example, the quantity of bits of the HARQ-ACK feedback information in the dynamic HARQ-ACK codebook for the PDCCH without scheduling data is equal to the product of the maximum quantity of CBGs of a TB of the PDSCH and the maximum quantity of TBs transmitted by the PDSCH.

In this example, if the network configures a CBG-based HARQ-ACK feedback and retransmission for the UE, the quantity of bits of the HARQ-ACK is calculated based on N=maximum quantity of CBGs and C=maximum quantity of TBs, and the UE generates and sends the HARQ-ACKs of $N*C$ bits.

Example 4: The quantity of bits of the HARQ-ACK feedback information in the dynamic HARQ-ACK codebook for the PDCCH without scheduling data is determined based on the maximum quantity of TRPs for transmitting the PDSCH and the maximum quantity of TBs transmitted by the PDSCH that are indicated by the configuration information.

For example, the quantity of bits of the HARQ-ACK feedback information in the dynamic HARQ-ACK codebook for the PDCCH without scheduling data is equal to the product of the maximum quantity of TRPs for transmitting the PDSCH and the maximum quantity of TBs transmitted by the PDSCH.

In this example, if the network configures, for the UE, a joint HARQ-ACK feedback for multiple-PDCCH based multiple TRPs (Multiple-PDCCH based Multiple TRP) (such as a joint HARQ-ACK feedback for PDCCHs in two TRPs), when the UE feeds back HARQ-ACKs for the PDCCHs from a plurality of TRPs at the same time, a quantity of bits of the HARQ-ACK is calculated based on K=maximum quantity of TRPs and M=maximum quantity of TBs transmitted by the PDSCH, and the UE generates and sends the HARQ-ACKs of $K*M$ bits.

Example 5: The quantity of bits of the HARQ-ACK feedback information in the dynamic HARQ-ACK codebook for the PDCCH without scheduling data is determined based on the maximum quantity of CBGs of a TB of the PDSCH, the maximum quantity of TBs transmitted by the PDSCH, and the maximum quantity of TRPs for transmitting the PDSCH that are indicated by the configuration information.

For example, the quantity of bits of the HARQ-ACK feedback information in the dynamic HARQ-ACK codebook for the PDCCH without scheduling data is equal to the product of the maximum quantity of CBGs of a TB of the PDSCH, the maximum quantity of TBs transmitted by the PDSCH, and the maximum quantity of TRPs for transmitting the PDSCH.

In this example, if the network configures, for the UE, a CBG-based HARQ-ACK feedback and retransmission and a joint HARQ-ACK feedback for multiple-PDCCH based multiple TRPs (Multiple-PDCCH based Multiple TRP) (such as a joint HARQ-ACK feedback for PDCCHs in two TRPs), when the UE feeds back HARQ-ACKs for the PDCCHs from a plurality of TRPs at the same time, a quantity of bits of the HARQ-ACK is calculated based on L=maximum quantity of CBGs, H=maximum quantity of TRPs, and P=maximum quantity of TBs transmitted by the PDSCH, and the UE generates and sends the HARQ-ACKs of $L*H*P$ bits.

In some implementations, as described in the above example 1 to example 5, in a case that the PDCCH without scheduling data is detected, the HARQ-ACK feedback information is fed back based on the quantity of bits of the HARQ-ACK feedback information for the PDCCH without scheduling data, where the HARQ-ACK feedback information is an ACK.

In some implementations, as described in the above example 1, and example 3 to example 5, all the bits in the HARQ-ACK feedback information are the ACK; or the first bit in the HARQ-ACK feedback information is the ACK; or at least one of the bits in the HARQ-ACK feedback information is the ACK.

In this embodiment of the present invention, the terminal can determine, based on the configuration information of the higher layer signaling, the format of the HARQ-ACK feedback information in the dynamic HARQ-ACK codebook for the PDCCH without scheduling data, such that the terminal and a network device have a consistent understanding of a HARQ-ACK feedback for the PDCCH without scheduling data, ensuring correct reception of the HARQ-ACK feedback for the PDCCH by the network device, and improving reliability of a communications system.

Figure 3:
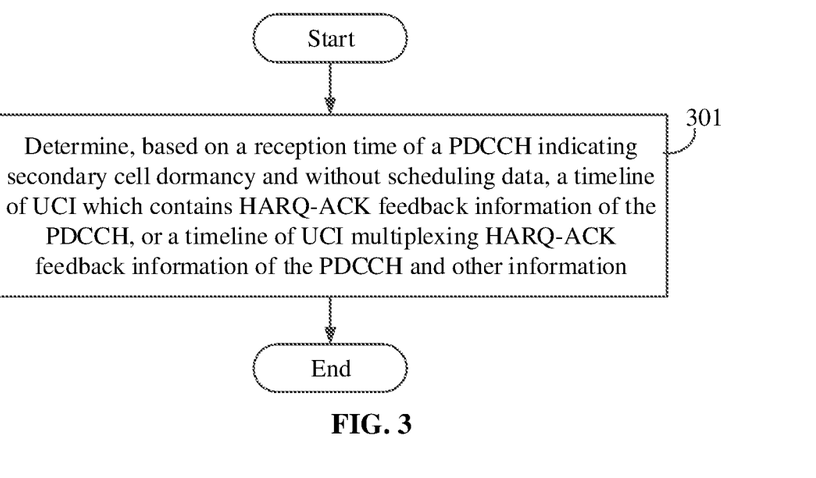
FIG. 3 is a second flowchart of a method for HARQ-ACK feedback for a PDCCH without scheduling data according to an embodiment of the present invention.

Referring to FIG. 3, an embodiment of the present invention further provides a method for determining a HARQ-ACK feedback for a PDCCH without scheduling data. The method may be executed by a terminal, and includes step 301.

Step 301: Determine, based on a reception time of a PDCCH that indicates secondary cell dormancy without scheduling data (PDCCH without scheduling PDSCH for Scell dormancy indication), a timeline of uplink control information (UCI) which contains HARQ-ACK feedback information of the PDCCH, or a timeline of UCI multiplexing HARQ-ACK feedback information of the PDCCH and other information.

The UCI includes the following types: HARQ-ACK, channel state information (CSI), and scheduling request (SR).

The UCI may be transmitted on a physical uplink control channel (PUCCH) resource, and the CSI may be triggered by DCI for being transmitted on a physical uplink shared channel (PUSCH). If the PUCCH and/or PUSCH resources for transmitting different UCI overlap on the time, the UE needs to multiplex the UCI to be transmitted on a plurality of channels onto one PUCCH resource or one PUSCH resource.

If a PUCCH for UCI transmission and a PUSCH for UE data transmission overlap in time domain, the UE multiplexes the UCI onto the PUSCH for transmission, where the PUSCH may be a scheduled PUSCH or a configured grant PUSCH.

In the embodiments of the present invention, the other information may be all UCIs except the HARQ-ACK of the PDCCH that indicates secondary cell dormancy without scheduling data.

Optionally, the other information may include any one or more of the following: (1) CSI; (2) SR; and (3) HARQ-ACK feedback for all feedbacks except the PDCCH that indicates secondary cell dormancy without scheduling data.

The following example 1 to example 3 describe how to determine the timeline of the UCI which contains the HARQ-ACK feedback information of the PDCCH, or the timeline of the UCI multiplexing the HARQ-ACK feedback information of the PDCCH and the other information.

Example 1: The timeline of the UCI which contains HARQ-ACK feedback information of the PDCCH is determined based on a reception time of the last symbol for the PDCCH that indicates secondary cell dormancy without scheduling data and a first time interval.

The first time interval includes N symbols, a value of N is related to a value of a subcarrier spacing (SCS) of the PDCCH, and N is greater than 1.

For example, for terminal processing capability 1 (UE processing capability 1): when the SCS of the PDCCH is 15 kHz, N=10; or when the SCS of the PDCCH is 30 kHz, N=12; or when the SCS of the PDCCH is 60 kHz, N=22; or when the SCS of the PDCCH is 120 kHz, N=25.

For another example, for a terminal with capability 2 in FR1 (450 MHz-6000 MHz, also referred to as Sub-6 GHz) (UE with capability 2 in FR1): when the SCS of the PDCCH is 15 kHz, N=5; or when the SCS of the PDCCH is 30 kHz, N=5.5; or when the SCS of the PDCCH is 60 kHz, N=11.

Example 2: The timeline of the UCI multiplexing the HARQ-ACK feedback information of the PDCCH and the other information is determined based on a reception time of the last symbol for the PDCCH that indicates secondary cell dormancy without scheduling data and a second time interval.

The second time interval is determined based on one or more of a quantity of sampling points of fast fourier transform (FFT) or inverse fast fourier transform (IFFT), a quantity of sampling points of cyclic prefix (CP), a sampling period, and an SCS of the PDCCH.

Further, the second time interval may be determined according to the following formula:

$$T=(N+1)\cdot(\text{a quantity of sampling points of FFT or IFFT}+\text{a quantity of sampling points of CP})\cdot \kappa \cdot 2^{-\mu}\cdot T_c$$

where T represents the second time interval;

$\mu$ corresponds to a minimum SCS configuration in SCS configurations of the PDCCH;

$\kappa$ is a constant (for example, $\kappa=T_s/T_c=64$), Tc is a basic time unit, $T_c=T_s/\kappa$, and Ts is the sampling period; and a value of N is related to a value of the SCS of the PDCCH, and N is greater than 1.

It can be understood that the terminal may receive one or more PDCCHs indicating secondary cell dormancy and without scheduling data, and the terminal determines the corresponding second time interval based on the received one or more PDCCHs.

For example, if the terminal receives a plurality of PDCCHs indicating secondary cell dormancy and without scheduling data and transmits HARQ-ACK feedback information of the plurality of PDCCHs in one UCI, and the plurality of PDCCHs may correspond to a plurality of second time intervals, the terminal may choose a maximum second time interval corresponding to the plurality of PDCCHs to determine the timeline of the UCI.

For example, if the terminal receives one PDCCH that indicates secondary cell dormancy without scheduling data, the terminal may choose a second time interval corresponding to the PDCCH to determine the timeline of the UCI.

The following describes parameters in the foregoing formula by using examples.

For example, the quantity of sampling points of FFT or IFFT is 2048, and the quantity of sampling points of CP is 144.

For another example, for terminal processing capability 1 (UE processing capability 1): when the SCS of the PDCCH is 15 kHz, N=10; or when the SCS of the PDCCH is 30 kHz, N=12; or when the SCS of the PDCCH is 60 kHz, N=22; or when the SCS of the PDCCH is 120 kHz, N=25.

For another example, for a terminal with capability 2 in FR1 (450 MHz-6000 MHz, also referred to as Sub-6 GHz) (UE with capability 2 in FR1): when the SCS of the PDCCH is 15 kHz, N=5; or when the SCS of the PDCCH is 30 kHz, N=5.5; or when the SCS of the PDCCH is 60 kHz, N=11.

Figure 4:
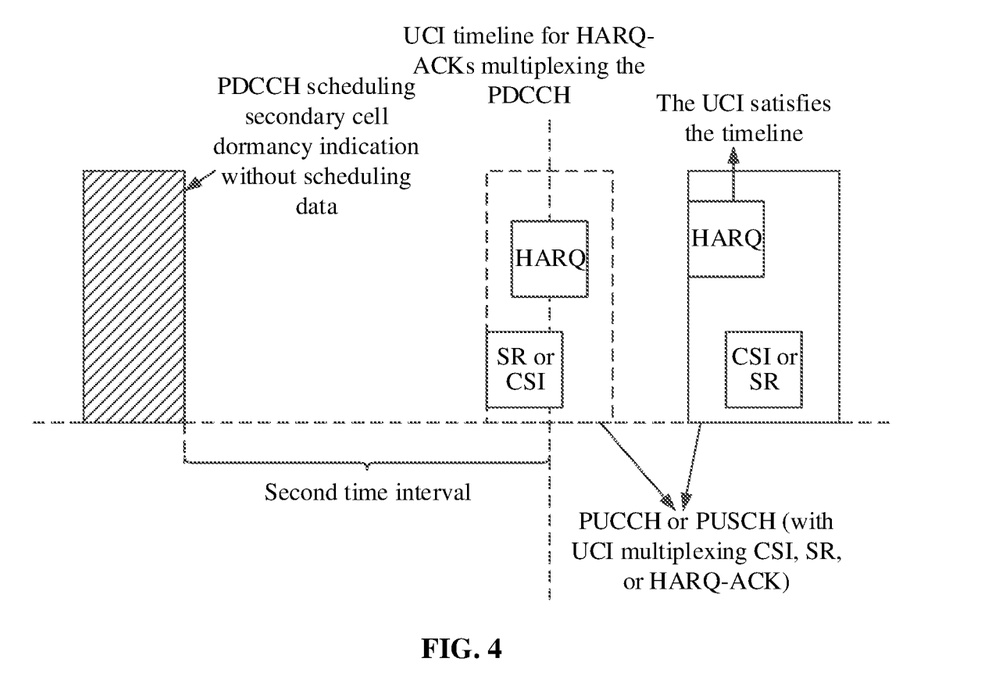
FIG. 4 is a schematic diagram of a timeline multiplexing UCI according to an embodiment of the present invention.

FIG. 4 is a schematic diagram of a timeline multiplexing UCI determined according to the foregoing formula.

If one PUCCH transmission or PUSCH transmission corresponds to one DCI format detected by the UE, the UE expects that in a group in a PUCCH and a PUSCH overlap in a slot, a first symbol $S_0$ of the earliest PUCCH or PUSCH satisfies the following timeline conditions:

(1) after one "PDCCH that indicates secondary cell dormancy without scheduling data" is received, $S_0$ needs to satisfy a time interval T $$T=(N+1)\cdot(2048+144)\cdot\kappa\cdot 2^{-\mu}\cdot T_C$$

The UE sends HARQ-ACK information on $S_0$ satisfying the foregoing time interval T or a symbol following $S_0$ to respond to detection of the PDCCH, where a value of N is as described above, and μ corresponds to a minimum SCS configuration in SCS configurations of the PDCCH.

(2) after a plurality of "PDCCHs indicating secondary cell dormancy and without scheduling data" are received, $S_0$ needs to satisfy time interval $T_{proc,PDCCH\ without\ PDSCH}^{mux}$, where time interval $T_{proc,PDCCH\ without\ PDSCH}^{mux}$, without PDSCH is a maximum value in $\{T_{proc,PDCCH\ without\ PDSCH}^{mux,1}, \ldots, T_{proc,PDCCH\ without\ PDSCH}^{mux,i}, \ldots\}$, and $T_{proc,PDCCH\ without\ PDSCH}^{mux,i}$ may be calculated according to the following formula:

$$T_{proc,PDCCH\ without\ PDSCH}^{mux,i}=(N+1)\cdot(2048+144)\cdot\kappa\cdot 2^{-\mu}\cdot T_C$$

where i corresponds to a quantity of the plurality of PDCCHs.

The UE sends HARQ-ACK information on $S_0$ satisfying the foregoing time interval $T_{proc,PDCCH\ without\ PDSCH}^{mux}$ or a symbol following $S_0$ to respond to detection of the plurality of PDCCHs.

A value of N is as described above, and μ corresponds to a minimum SCS configuration in SCS configurations of the plurality of PDCCHs.

Example 3: The timeline of the UCI which contains the HARQ-ACK feedback information of the PDCCH is determined based on a reception time of the PDCCH that indicates secondary cell dormancy without scheduling data and a third time interval.

The third time interval is a time interval from receiving of the last symbol for the PDCCH to the first symbol of feeding back the HARQ-ACK feedback information of an uplink physical channel for the PDCCH.

In the foregoing example 1 to example 3, the UCI which contains the HARQ-ACK feedback information of the PDCCH is carried on one or more of the following physical uplink channels: (1) PUCCH; and (2) PUSCH.

In this embodiment of the present invention, the terminal determines, based on the reception time of the PDCCH that indicates secondary cell dormancy without scheduling data, the timeline of the UCI which contains the HARQ-ACK feedback information of the PDCCH, or the timeline of the UCI multiplexing the HARQ-ACK feedback information of the PDCCH and other information. This ensures that the terminal and a network device have a consistent understanding of the HARQ-ACK feedback for the PDCCH without scheduling data, allowing the network device to correctly receive the HARQ-ACK feedback for the PDCCH, and improving reliability of a communications system.

Figure 5:
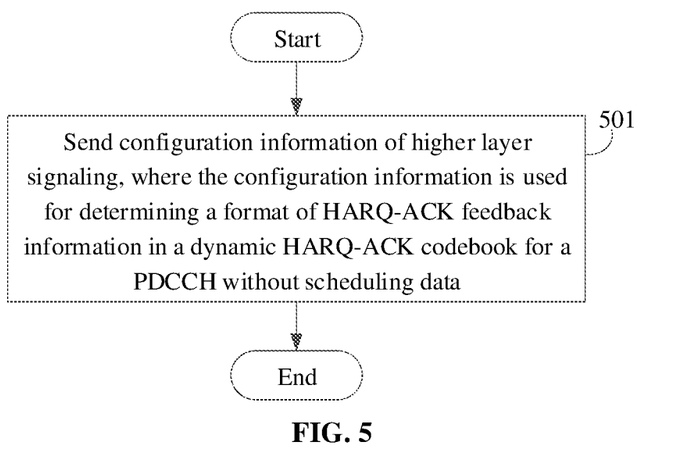
FIG. 5 is a flowchart of a method for indicating a HARQ-ACK feedback for a PDCCH without scheduling data according to an embodiment of the present invention.

Referring to FIG. 5, an embodiment of the present invention further provides a method for indicating a HARQ-ACK feedback for a PDCCH without scheduling data. The method may be executed by a network device, and includes step 501.

Step 501: Send configuration information of higher layer signaling, where the configuration information is used for determining a format of HARQ-ACK feedback information in a dynamic HARQ-ACK codebook for the PDCCH without scheduling data.

In this embodiment of the present invention, the higher layer signaling may be RRC signaling, and certainly, is not limited thereto.

In some implementations, optionally, the method further includes:

sending the higher layer signaling or DCI, where the higher layer signaling or the DCI indicates a terminal to feed back the HARQ-ACK feedback information for the PDCCH without scheduling data in a first sub-codebook or a second sub-codebook.

In this embodiment of the present invention, consistent understanding of the HARQ-ACK feedback for the PDCCH without scheduling data can be ensured between the terminal and the network device, such that the network device correctly receives the HARQ-ACK feedback for the PDCCH, improving reliability of a communications system.

Figure 6:
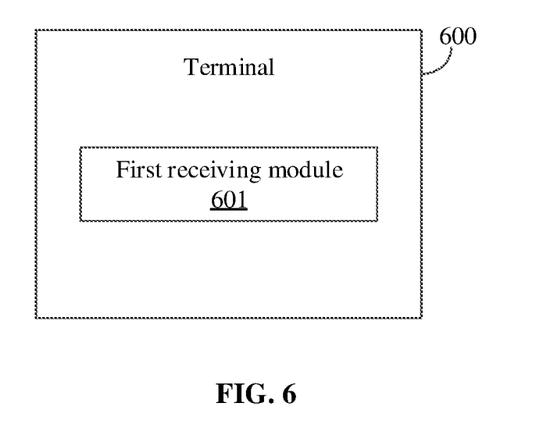
FIG. 6 is a first schematic diagram of a terminal according to an embodiment of the present invention.

Referring to FIG. 6, an embodiment of the present invention further provides a terminal. The terminal 600 includes:

a first receiving module 601, configured to receive configuration information of higher layer signaling, where the configuration information is used for determining a format of HARQ-ACK feedback information in a dynamic HARQ-ACK codebook for a PDCCH without scheduling data.

In some implementations, the terminal shown in FIG. 6 further includes a first feedback module 602, where the feedback module 602 is configured to:

feed back, based on the format of the HARQ-ACK feedback information, the HARQ-ACK feedback information for the PDCCH without scheduling data in a first sub-codebook, where the first sub-codebook is used for a transport block TB-based HARQ-ACK feedback; or feed back, based on the format of the HARQ-ACK feedback information, the HARQ-ACK feedback information for the PDCCH without scheduling data in a second sub-codebook, where the second sub-codebook is used for a code block group CBG-based HARQ-ACK feedback.

In some implementations, the terminal shown in FIG. 6 further includes:

a second receiving module, configured to receive the higher layer signaling or DCI, where the higher layer signaling or the DCI indicates the terminal to feed back the HARQ-ACK feedback information for the PDCCH without scheduling data in the first sub-codebook or the second sub-codebook.

In some implementations, the DCI includes a first field, where a bit in the first field indicates the terminal to feed back the HARQ-ACK feedback information for the PDCCH without scheduling data in the first sub-codebook or the second sub-codebook; where the first field includes one or more of the following:

(1) MCS;
(2) RV;
(3) HARQ process number;

(4) NDI; and (5) t-DAI.

In some implementations, the configuration information may include at least one of the following:
 (1) a quantity of TBs of a PDSCH, such as a maximum quantity of TBs of the PDSCH;
 (2) a quantity of CBGs of each TB of the PDSCH, such as a maximum quantity of CBGs of each TB of the PDSCH;
 (3) a quantity of TRPs for transmitting the PDSCH, such as a maximum quantity of TRPs for transmitting the PDSCH;
 (4) a dynamic sub-codebook corresponding to the HARQ-ACK feedback information for the PDCCH without scheduling data; and
 (5) whether HARQ-ACK spatial bundling indication is enabled.

In some implementations, the configuration information indicates that a maximum quantity of downlink TBs of a PDSCH is 2, and the format of the HARQ-ACK feedback information for the PDCCH without scheduling data includes 2 HARQ-ACK bits; or the configuration information indicates that a maximum quantity of downlink TBs of a PDSCH is 2 and that the HARQ-ACK spatial bundling indication is enabled, and the format of the HARQ-ACK feedback information for the PDCCH without scheduling data includes 1 HARQ-ACK bit.

In some implementations, the format of the HARQ-ACK feedback information includes a quantity of bits of the HARQ-ACK feedback information, where the quantity of bits of the HARQ-ACK feedback information is determined based on the following:
 the maximum quantity of CBGs of a TB of the PDSCH and the maximum quantity of TBs transmitted by the PDSCH that are indicated by the configuration information;
 or
 the maximum quantity of TRPs for transmitting the PDSCH and the maximum quantity of TBs transmitted by the PDSCH that are indicated by the configuration information;
 or
 the maximum quantity of CBGs of a TB of the PDSCH, the maximum quantity of TBs transmitted by the PDSCH, and the maximum quantity of TRPs for transmitting the PDSCH that are indicated by the configuration information.

In some implementations, the quantity of bits of the HARQ-ACK feedback information in the dynamic HARQ-ACK codebook for the PDCCH without scheduling data is equal to:
 a product of the maximum quantity of CBGs of a TB of the PDSCH and the maximum quantity of TBs transmitted by the PDSCH;
 or
 a product of the maximum quantity of TRPs for transmitting the PDSCH and the maximum quantity of TBs transmitted by the PDSCH;
 or
 a product of the maximum quantity of CBGs of a TB of the PDSCH, the maximum quantity of TBs transmitted by the PDSCH, and the maximum quantity of TRPs for transmitting the PDSCH.

In some implementations, the terminal further includes a second feedback module, configured to, in a case that the PDCCH without scheduling data is detected, feed back, based on a quantity of bits of the HARQ-ACK feedback information, the HARQ-ACK feedback information for the PDCCH without scheduling data, where the HARQ-ACK feedback information is an acknowledgement ACK.

In some implementations, all the bits in the HARQ-ACK feedback information are the ACK; or the first bit in the HARQ-ACK feedback information is the ACK; or at least one of the bits in the HARQ-ACK feedback information is the ACK.

The terminal provided in this embodiment of the present invention can execute the foregoing method embodiment shown in FIG. 2, implementation principles and technical effects thereof are similar, and details are not described herein again.

Figure 7:
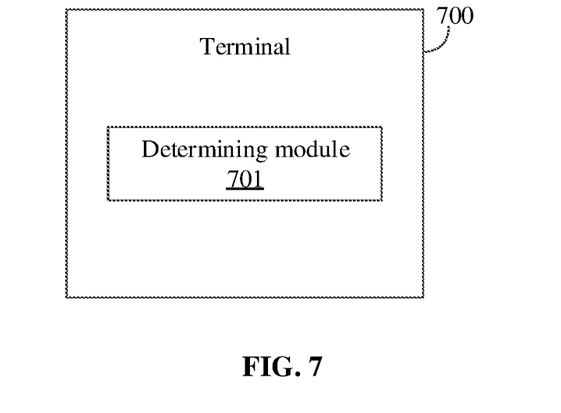
FIG. 7 is a second schematic diagram of a terminal according to an embodiment of the present invention.

Referring to FIG. 7, an embodiment of the present invention further provides a terminal. The terminal 700 includes:
 a determining module 701, configured to determine, based on a reception time of a PDCCH that indicates secondary cell dormancy without scheduling data, a timeline of uplink control information UCI which contains HARQ-ACK feedback information of the PDCCH, or a timeline of UCI multiplexing HARQ-ACK feedback information of the PDCCH and other information.

In some implementations, the determining module 701 is further configured to determine, based on a reception time of the last symbol for the PDCCH that indicates secondary cell dormancy without scheduling data and a first time interval, the timeline of the UCI which contains the HARQ-ACK feedback information of the PDCCH; where the first time interval includes N symbols, a value of N is related to a value of an SCS of the PDCCH, and N is greater than 1.

In some implementations, the determining module 701 is further configured to determine, based on a reception time of the last symbol for the PDCCH that indicates secondary cell dormancy without scheduling data and a second time interval, the timeline of the UCI multiplexing the HARQ-ACK feedback information of the PDCCH and the other information; where
 the second time interval is determined based on one or more of a quantity of sampling points of fast fourier transform FFT, a quantity of sampling points of cyclic prefix CP, a sampling period, and a subcarrier spacing SCS of the PDCCH.

In some implementations, the second time interval is determined according to the following formula:

$$T=(N+1)\cdot(\text{a quantity of sampling points of FFT or IFFT}+\text{a quantity of sampling points of CP})\cdot\kappa\cdot 2^{-\mu}\cdot T_C$$

where T represents the second time interval; $\mu$ corresponds to a minimum SCS configuration in SCS configurations of the PDCCH; K is a constant (for example, $K=T_s/T_c=64$), Tc is a basic time unit, $T_c=T_s/K$, and Ts is the sampling period; and a value of N is related to a value of the SCS of the PDCCH, and N is greater than 1.

In some implementations, when the SCS of the PDCCH is 15 kHz, N=10; or when the SCS of the PDCCH is 30 kHz, N=12; or when the SCS of the PDCCH is 60 kHz, N=22; or when the SCS of the PDCCH is 120 kHz, N=25; or when the SCS of the PDCCH is 15 kHz, N=5; or when the SCS of the PDCCH is 30 kHz, N=5.5; or when the SCS of the PDCCH is 60 kHz, N=11.

In some implementations, the determining module 701 is further configured to determine, based on the reception time of the PDCCH that indicates secondary cell dormancy without scheduling data and a third time interval, the timeline of the UCI which contains the HARQ-ACK feedback information of the PDCCH; where the third time interval is a time interval from receiving of the last symbol for the PDCCH to the first symbol of feeding back the HARQ-ACK feedback information of an uplink physical channel for the PDCCH.

The terminal provided in this embodiment of the present invention can execute the foregoing method embodiment shown in FIG. 3, implementation principles and technical effects thereof are similar, and details are not described herein again.

Figure 8:
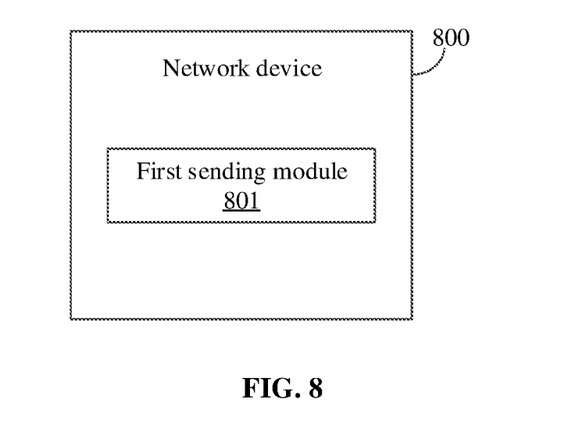
FIG. 8 is a schematic diagram of a network device according to an embodiment of the present invention.

Referring to FIG. 8, an embodiment of the present invention further provides a network device. The network device 800 includes:

a first sending module 801, configured to send configuration information of higher layer signaling, where the configuration information is used for determining a format of HARQ-ACK feedback information in a dynamic HARQ-ACK codebook for a PDCCH without scheduling data.

In some implementations, the network device 800 shown in FIG. 8 further includes a second sending module, configured to send the higher layer signaling or DCI, where the higher layer signaling or the DCI indicates a terminal to feed back the HARQ-ACK feedback information for the PDCCH without scheduling data in a first sub-codebook or a second sub-codebook.

The network device provided in this embodiment of the present invention can execute the foregoing method embodiment shown in FIG. 5, implementation principles and technical effects thereof are similar, and details are not described herein again.

Figure 9:
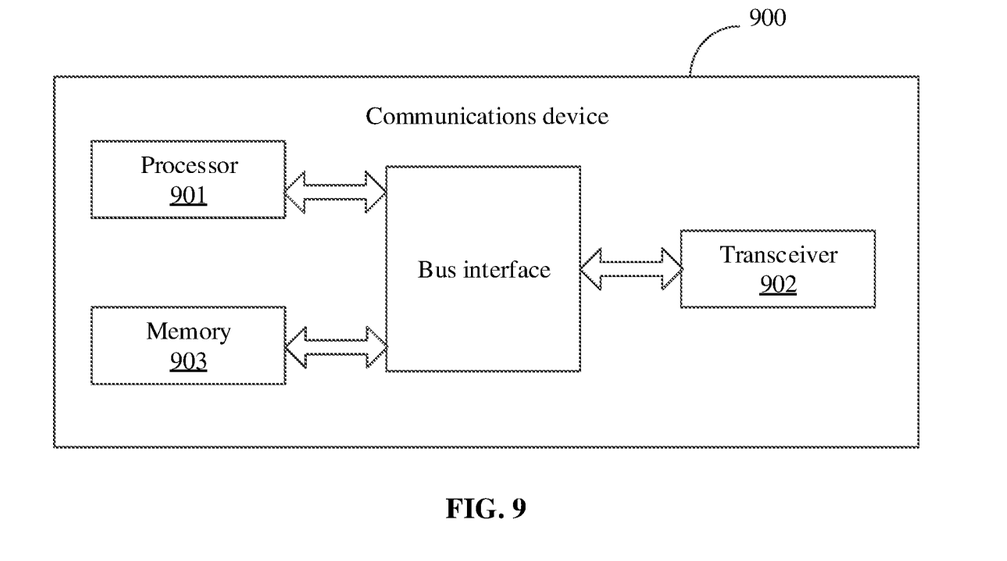
FIG. 9 is a schematic diagram of a communications device according to an embodiment of the present invention.

FIG. 9 is a structural diagram of a communications device to which the embodiments of the present invention is applied. As shown in FIG. 9, the communications device 900 includes a processor 901, a transceiver 902, a memory 903, and a bus interface. The processor 901 may be responsible for managing a bus architecture and general processing. The memory 903 may store data that the processor 901 uses when performing an operation.

In an embodiment of the present invention, the communications device 900 further includes a program stored in the memory 903 and capable of running on the processor 901. When the program is executed by the processor 901, the steps of the foregoing method shown in FIG. 2, FIG. 3 or FIG. 5 are implemented.

In FIG. 9, a bus architecture may include any quantity of interconnected buses and bridges, and specifically connect together various circuits of one or more processors represented by the processor 901 and a memory represented by the memory 903. The bus architecture may further interconnect various other circuits such as a peripheral device, a voltage regulator, and a power management circuit. These are all common sense in the art, and therefore are not further described in this specification. The bus interface provides an interface. The transceiver 902 may be a plurality of components, that is, the transceiver 902 includes a transmitter and a receiver, and provides a unit for communicating with various other apparatuses on a transmission medium.

The communications device provided in this embodiment of the present invention can execute the foregoing method embodiment shown in FIG. 2, FIG. 3 or FIG. 5, implementation principles and technical effects thereof are similar, and details are not described herein again.

Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory, or any other form of storage medium well-known in the art. For example, a storage medium is coupled to the processor, enabling the processor to read information from the storage medium and write information into the storage medium. Certainly, the storage medium may be a component of the processor. The processor and the storage medium may be located in an application-specific integrated circuit (ASIC). In addition, the ASIC may be located in a core network interface device. Certainly, the processor and the storage medium may exist in the core network interface device as discrete components.

A person skilled in the art should be aware that, in the foregoing one or more examples, functions described in the present invention may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Obviously, a person skilled in the art can make various modifications and variations to the embodiments of the present invention without departing from the spirit and scope of the present invention. The present invention is intended to cover these modifications and variations provided that they fall within the scope of protection defined by the following claims and their equivalent technologies.

What is claimed is:

1. A method for hybrid automatic repeat request acknowledgement (HARQ-ACK) feedback for a physical downlink control channel (PDCCH) without scheduling data, performed by a terminal, the method comprising:
   receiving configuration information of higher layer signaling, wherein the configuration information is used for determining a format of HARQ-ACK feedback information in a dynamic HARQ-ACK codebook for the PDCCH without scheduling data;
   in response to the PDCCH without scheduling data being detected, feeding back, based on a quantity of bits of the HARQ-ACK feedback information and the format of the HARQ-ACK feedback information, the HARQ-ACK feedback information for the PDCCH without scheduling data in a first sub-codebook, wherein the HARQ-ACK feedback information is an acknowledgement (ACK), and the first sub-codebook is used for a transport block (TB)-based HARQ-ACK feedback;
   wherein the PDCCH without scheduling data comprises a PDCCH indicating secondary cell (SCell) dormancy without scheduling data.

2. The method according to claim 1, further comprising:
   receiving the higher layer signaling or downlink control information (DCI), wherein the higher layer signaling or the DCI indicates the terminal to feed back the HARQ-ACK feedback information for the PDCCH without scheduling data in the first sub-codebook.

3. The method according to claim 2, wherein the DCI comprises a first field, and a bit in the first field indicates the terminal to feed back the HARQ-ACK feedback information for the PDCCH without scheduling data in the first sub-codebook; wherein
   the first field comprises one or more of:
   modulation and coding scheme (MCS);
   redundancy version (RV);
   HARQ process number;
   new data indication (NDI); and
   total downlink assignment index (t-DAI).

4. The method according to claim 1, wherein the configuration information indicates at least one of:
   a quantity of TBs of a physical downlink shared channel (PDSCH);
   a quantity of CBGs of each TB of the PDSCH;
   a quantity of transmission and reception points (TRPs) for transmitting the PDSCH;
   a dynamic sub-codebook corresponding to the HARQ-ACK feedback information for the PDCCH without scheduling data; and
   whether a HARQ-ACK spatial bundling indication is enabled.

5. The method according to claim 4, wherein
   the configuration information indicates that a maximum quantity of downlink TBs of the PDSCH is 2, and the format of the HARQ-ACK feedback information for the PDCCH without scheduling data comprises 2 HARQ-ACK bits;
   or
   the configuration information indicates that a maximum quantity of downlink TBs of the PDSCH is 2 and that the HARQ-ACK spatial bundling indication is enabled, and the format of the HARQ-ACK feedback information for the PDCCH without scheduling data comprises 1 HARQ-ACK bit.

6. The method according to claim 4, wherein the format of the HARQ-ACK feedback information comprises the quantity of bits of the HARQ-ACK feedback information, wherein the quantity of bits of the HARQ-ACK feedback information is determined based on:
   a maximum quantity of CBGs of a TB of the PDSCH and a maximum quantity of TBs transmitted by the PDSCH that are indicated by the configuration information;
   or
   a maximum quantity of TRPs for transmitting the PDSCH and a maximum quantity of TBs transmitted by the PDSCH that are indicated by the configuration information;
   or
   a maximum quantity of CBGs of a TB of the PDSCH, a maximum quantity of TBs transmitted by the PDSCH, and a maximum quantity of TRPs for transmitting the PDSCH that are indicated by the configuration information.

7. The method according to claim 6, wherein the quantity of bits of the HARQ-ACK feedback information in the dynamic HARQ-ACK codebook for the PDCCH without scheduling data is equal to:
   a product of the maximum quantity of CBGs of a TB of the PDSCH and the maximum quantity of TBs transmitted by the PDSCH;
   or
   a product of the maximum quantity of TRPs for transmitting the PDSCH and the maximum quantity of TBs transmitted by the PDSCH;
   or
   a product of the maximum quantity of CBGs of a TB of the PDSCH, the maximum quantity of TBs transmitted by the PDSCH, and the maximum quantity of TRPs for transmitting the PDSCH.

8. The method according to claim 1, wherein
all the bits in the HARQ-ACK feedback information are the ACK;
or
the first bit in the HARQ-ACK feedback information is the ACK;
or
at least one of the bits in the HARQ-ACK feedback information is the ACK.

9. A method for indicating a hybrid automatic repeat request acknowledgement (HARQ-ACK) feedback for a physical downlink control channel (PDCCH) without scheduling data, performed by a network device, the method comprising:
sending configuration information of higher layer signaling, wherein the configuration information is used for determining a format of HARQ-ACK feedback information in a dynamic HARQ-ACK codebook for the PDCCH without scheduling data; and
receiving the HARQ-ACK feedback information for the PDCCH without scheduling data in a first sub-codebook which is fed back by a terminal in a case that the PDCCH without scheduling data is detected based on a quantity of bits of the HARQ-ACK feedback information and the format of the HARQ-ACK feedback information, wherein the HARQ-ACK feedback information is an acknowledgement (ACK), and the first sub-codebook is used for a transport block (TB)-based HARQ-ACK feedback;
wherein the PDCCH without scheduling data comprises a PDCCH indicating secondary cell (SCell) dormancy without scheduling data.

10. The method according to claim 9, further comprising:
sending the higher layer signaling or downlink control information (DCI), wherein the higher layer signaling or the DCI indicates the terminal to feed back the HARQ-ACK feedback information for the PDCCH without scheduling data in the first sub-codebook.

11. A network device, comprising a processor, a memory, and a program stored in the memory and capable of running on the processor, wherein the program, when being executed by the processor, implements the steps of the method for HARQ-ACK feedback for a PDCCH without scheduling data according to claim 9.

12. The method according to claim 9, wherein
all the bits in the HARQ-ACK feedback information are the ACK;
or
the first bit in the HARQ-ACK feedback information is the ACK;
or
at least one of the bits in the HARQ-ACK feedback information is the ACK.

13. A terminal, comprising a processor, a memory, and a program stored in the memory and capable of running on the processor, wherein the program, when being executed by the processor, implements a method for hybrid automatic repeat request acknowledgement (HARQ-ACK) feedback for a physical downlink control channel (PDCCH) without scheduling data comprising a step of:
receiving configuration information of higher layer signaling, wherein the configuration information is used for determining a format of HARQ-ACK feedback information in a dynamic HARQ-ACK codebook for the PDCCH without scheduling data;
in a case that the PDCCH without scheduling data is detected, feeding back, based on a quantity of bits of the HARQ-ACK feedback information and the format of the HARQ-ACK feedback information, the HARQ-ACK feedback information for the PDCCH without scheduling data in a first sub-codebook, wherein the HARQ-ACK feedback information is an acknowledgement (ACK), and the first sub-codebook is used for a transport block (TB)-based HARQ-ACK feedback;
wherein the PDCCH without scheduling data comprises a PDCCH indicating secondary cell (SCell) dormancy without scheduling data.

14. The terminal according to claim 13, wherein the program, when being executed by the processor, further implements:
receiving the higher layer signaling or downlink control information (DCI), wherein the higher layer signaling or the DCI indicates the terminal to feed back the HARQ-ACK feedback information for the PDCCH without scheduling data in the first sub-codebook.

15. The terminal according to claim 13, wherein the configuration information indicates at least one of:
a quantity of TBs of a physical downlink shared channel (PDSCH);
a quantity of CBGs of each TB of the PDSCH;
a quantity of transmission and reception points (TRPs) for transmitting the PDSCH;
a dynamic sub-codebook corresponding to the HARQ-ACK feedback information for the PDCCH without scheduling data; and
whether a HARQ-ACK spatial bundling indication is enabled.

16. The terminal according to claim 15, wherein
the configuration information indicates that a maximum quantity of downlink TBs of the PDSCH is 2, and the format of the HARQ-ACK feedback information for the PDCCH without scheduling data comprises 2 HARQ-ACK bits;
or
the configuration information indicates that a maximum quantity of downlink TBs of the PDSCH is 2 and that the HARQ-ACK spatial bundling indication is enabled, and the format of the HARQ-ACK feedback information for the PDCCH without scheduling data comprises 1 HARQ-ACK bit.

17. The terminal according to claim 13, wherein
all the bits in the HARQ-ACK feedback information are the ACK;
or
the first bit in the HARQ-ACK feedback information is the ACK;
or
at least one of the bits in the HARQ-ACK feedback information is the ACK.

18. The terminal according to claim 14, wherein the DCI comprises a first field, and a bit in the first field indicates the terminal to feed back the HARQ-ACK feedback information for the PDCCH without scheduling data in the first sub-codebook; wherein
the first field comprises one or more of:
modulation and coding scheme (MCS);
redundancy version (RV);
HARQ process number;
new data indication (NDI); and
total downlink assignment index (t-DAI).

19. The terminal according to claim 15, wherein the format of the HARQ-ACK feedback information comprises the quantity of bits of the HARQ-ACK feedback information, wherein the quantity of bits of the HARQ-ACK feedback information is determined based on:
- a maximum quantity of CBGs of a TB of the PDSCH and a maximum quantity of TBs transmitted by the PDSCH that are indicated by the configuration information;

or
- a maximum quantity of TRPs for transmitting the PDSCH and a maximum quantity of TBs transmitted by the PDSCH that are indicated by the configuration information;

or
- a maximum quantity of CBGs of a TB of the PDSCH, a maximum quantity of TBs transmitted by the PDSCH, and a maximum quantity of TRPs for transmitting the PDSCH that are indicated by the configuration information.

20. The terminal according to claim 15, wherein the quantity of bits of the HARQ-ACK feedback information in the dynamic HARQ-ACK codebook for the PDCCH without scheduling data is equal to:
- a product of the maximum quantity of CBGs of a TB of the PDSCH and the maximum quantity of TBs transmitted by the PDSCH;

or
- a product of the maximum quantity of TRPs for transmitting the PDSCH and the maximum quantity of TBs transmitted by the PDSCH;

or
- a product of the maximum quantity of CBGs of a TB of the PDSCH, the maximum quantity of TBs transmitted by the PDSCH, and the maximum quantity of TRPs for transmitting the PDSCH.

\* \* \* \* \*